UNITED STATES PATENT OFFICE.

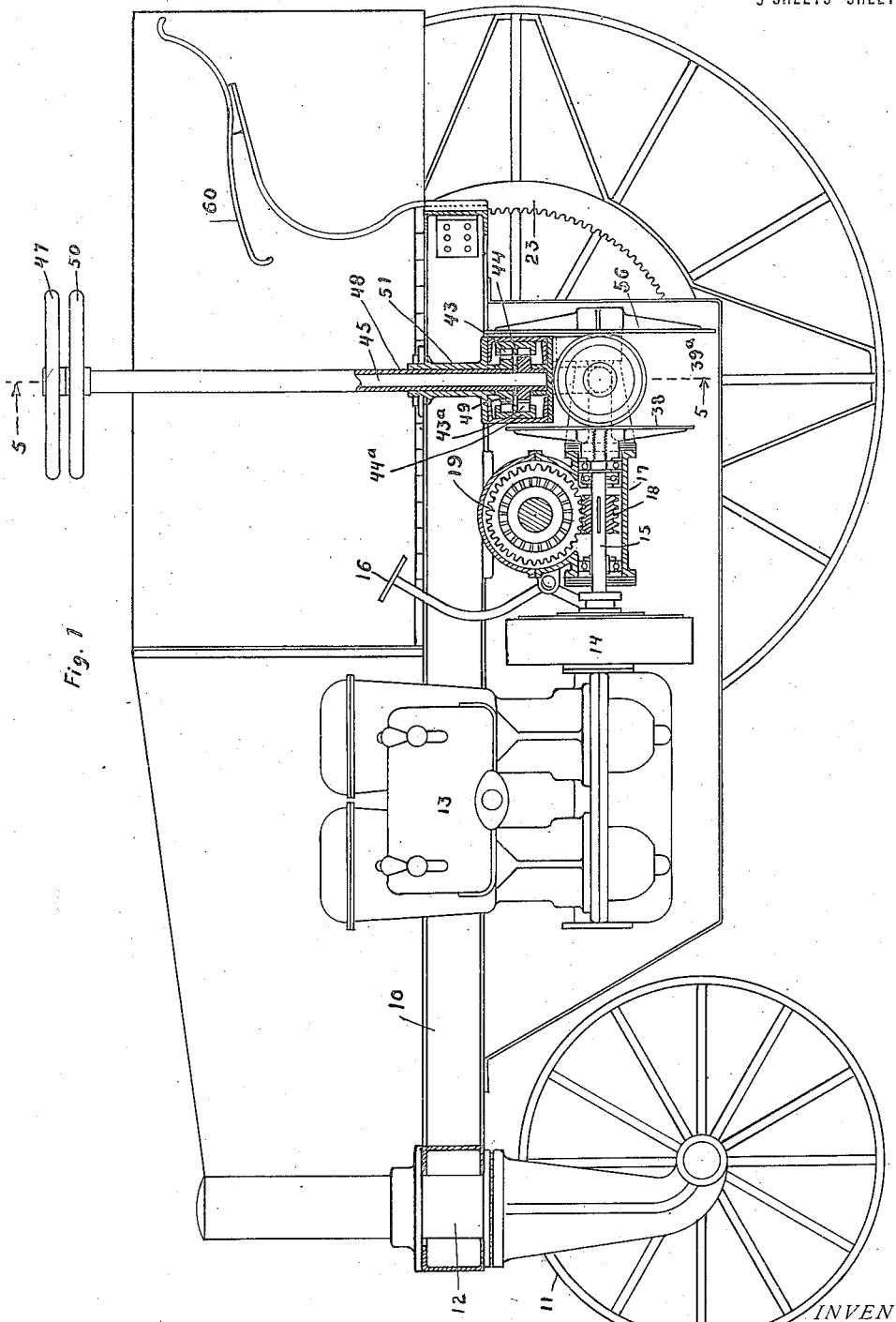

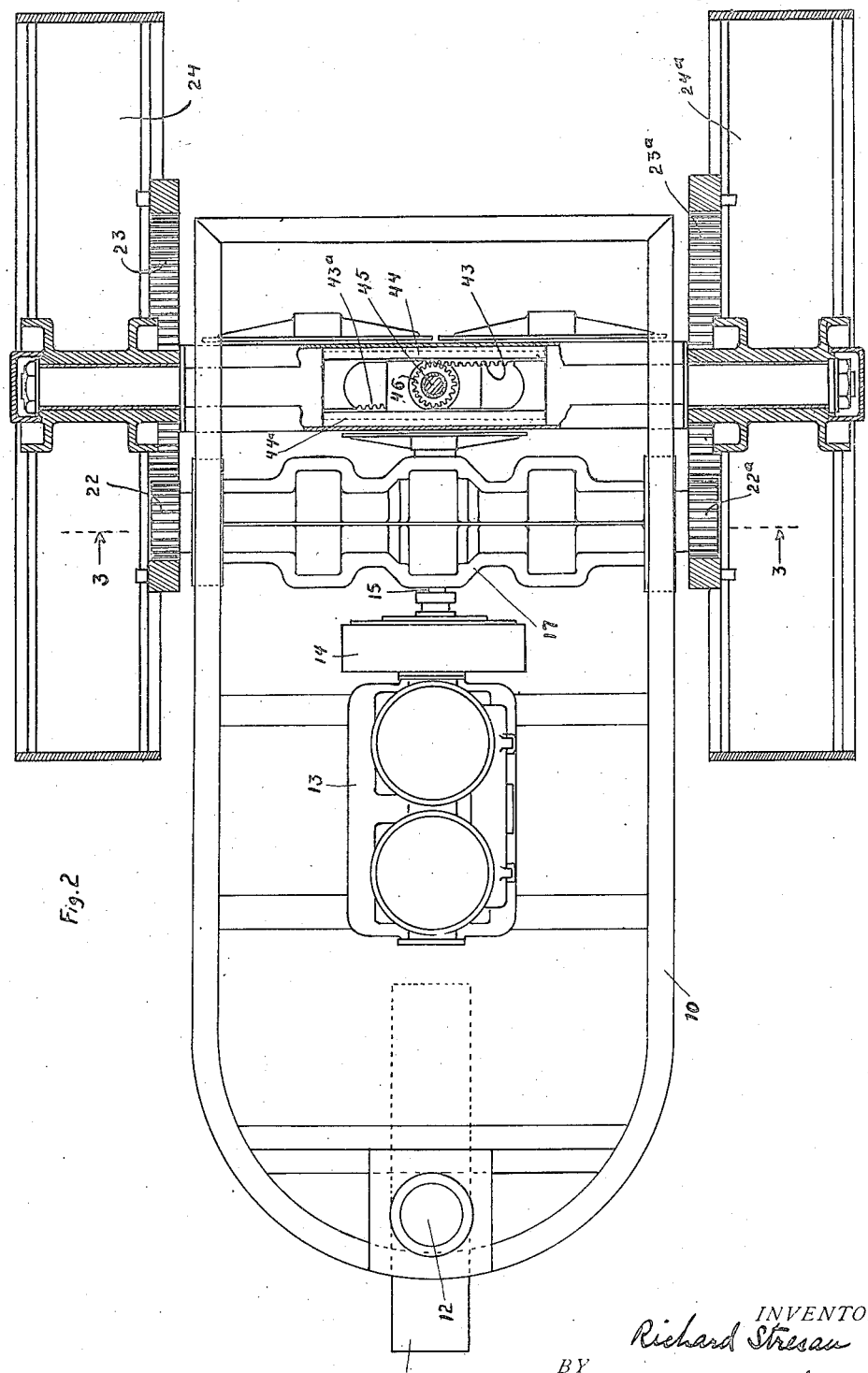

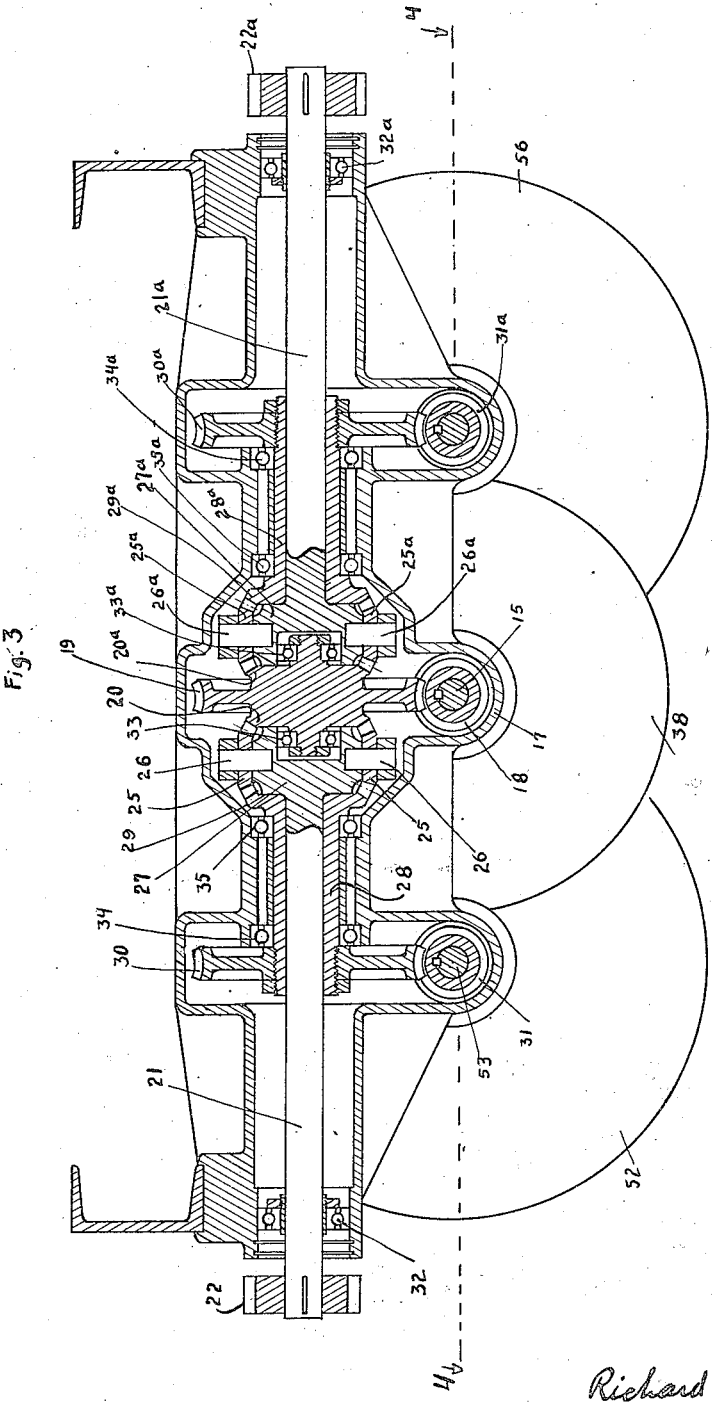

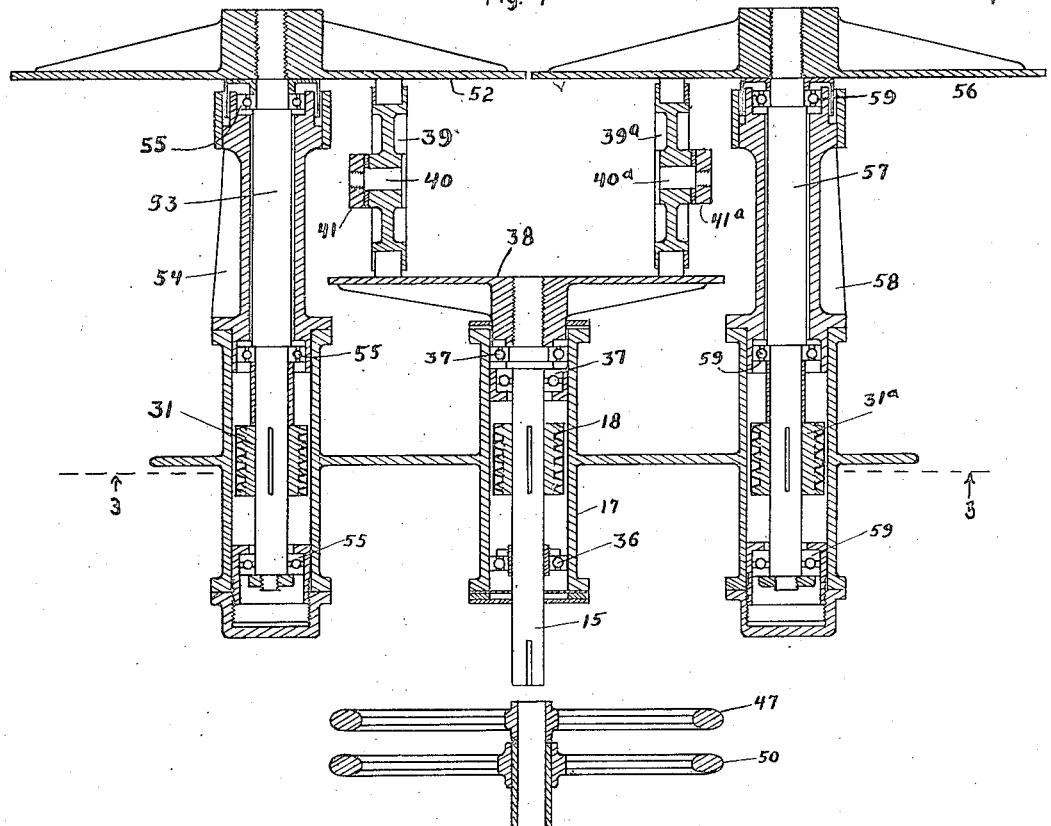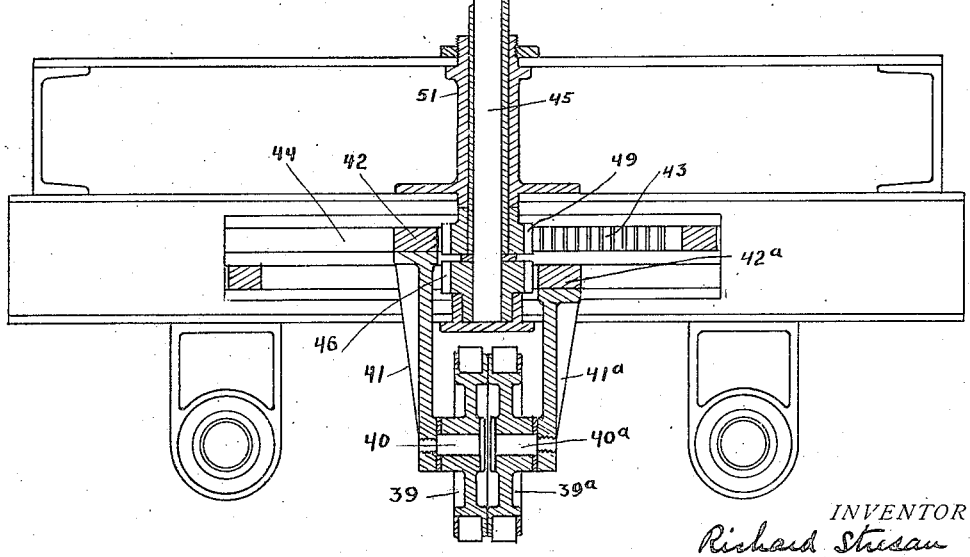

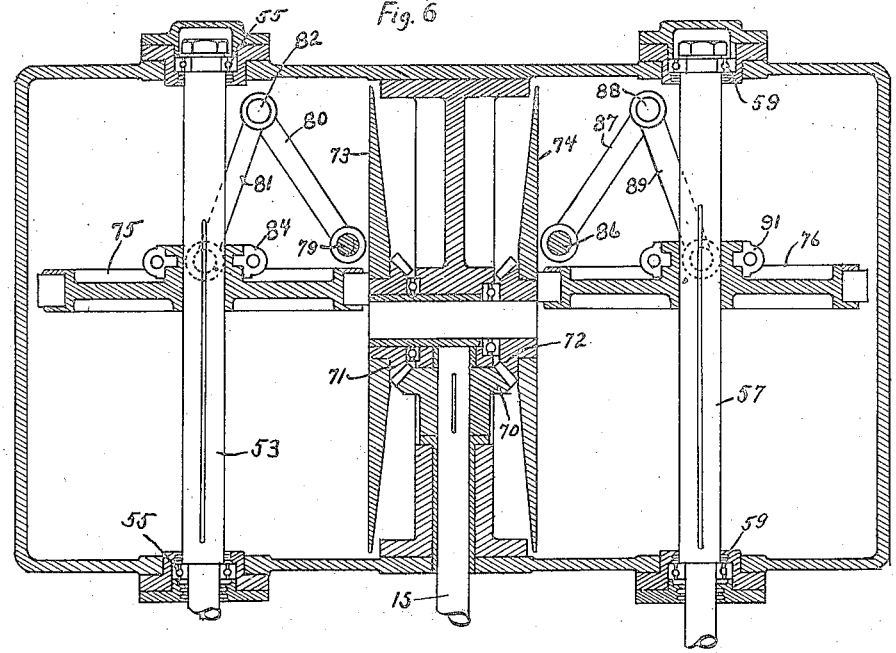
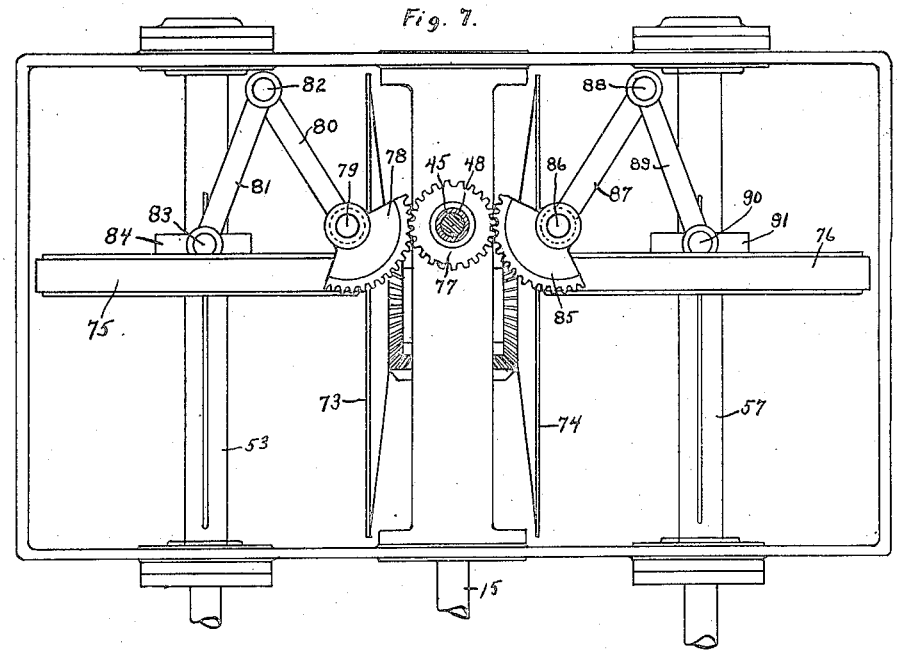

RICHARD STRESAU, OF QUOGUE, NEW YORK.

SPEED-CHANGING DEVICE.

1,426,926.   Specification of Letters Patent.   Patented Aug. 22, 1922.

Application filed May 16, 1918. Serial No. 234,907.

*To all whom it may concern:*

Be it known that I, RICHARD STRESAU, a citizen of the United States, and resident of Quogue, Long Island, in the county of Suffolk and State of New York, have invented certain new and useful Improvements in Speed-Changing Devices, of which the following is a specification.

My invention relates to improvements in speed changing devices and while it may be used for many purposes and in many situations it is especially adapted for use in connection with driving means of a vehicle, particularly those of the motor operated tractor type.

One object of the invention is to provide a simple and efficient arrangement by means of which the relative speeds of two driving shafts, as for example shafts for driving traction wheels of such a vehicle, may be varied independently of one another and independently of the speed of the driving means. In its preferred form the invention contemplates the provision of an arrangement by which not only may the speed of the traction wheels be varied by infinite gradations independently of the speed of the engine driving the vehicle but also the speed of one traction wheel may be varied by infinite gradation independently of the speed of the other traction wheel and independently of the speed of the driving engine and even the traction wheels may be reversed without disconnecting the driving means therefrom.

Further and more specific objects, features and advantages will more clearly appear from the detail description given below taken in connection with the accompanying drawings which form a part of this specification.

In the drawings Fig. 1 is a side view partly in section illustrating the motor operated tractor embodying my invention in one form. Fig. 2 is a plan view of the same, certain parts being shown in section to more clearly illustrate the same. Fig. 3 is a detail section taken on a line 3—3 of Fig. 2 and on a line 3—3 of Fig. 4. Fig. 4 is a detail section taken on a line 4—4 of Fig. 3. Fig. 5 is a detail section taken on a line 5—5 of Fig. 1. Fig. 6 is a section similar to the section shown in Fig. 4 but illustrating a modified form of arrangement.

Fig. 7 is a top plan view of apparatus shown in Figure 6.

Referring to Figures 1 to 5 inclusive, 10 represents the main frame or chassis of a tractor having a single front wheel 11 with a journal at 12. 13 represents a gasoline engine for driving the tractor. 14 represents a clutch of any well-known or suitable variety for connecting the shaft of the engine 13 with a driving shaft 15. A pedal 16 is provided for operating the clutch 14.

The driving shaft 15 extends into a casing 17 and has keyed thereon a worm 18 which meshes with and drives a worm gear 19. The worm gear 19 has integral therewith two bevel gears 20 and 20$^a$, one on each side of the worm gear 19.

21 and 21$^a$ represent shafts in alinement with one another and having keyed on their outer ends pinions 22 and 22$^a$ which mesh with internal gears 23 and 23$^a$ respectively, rigidly secured to the traction wheels 24 and 24$^a$ respectively for driving the same. At their inner ends the shafts 21 and 21$^a$ carry planetary gears 25, 25 and 25$^a$, 25$^a$ these planetary gears being journalled about pivot pins 26, 26 and 26$^a$ 26$^a$, secured in the heads 27 and 27$^a$ respectively on the inner ends of the shafts 21 and 21$^a$ respectively. Mounted on the inner ends of the shafts 21 and 21$^a$ and adjacent heads 27 and 27$^a$ are sleeves 28 and 28$^a$ which carry bevel gears 29 and 29$^a$ respectively, meshing with the planetary gears 25, 25 and 25$^a$, 25$^a$ respectively. At the opposite ends of the sleeves 28 and 28$^a$ there are secured thereon worm gears 30 30$^a$ respectively, the same being driven by worms 31 and 31$^a$ respectively. At their outer ends shafts 21 and 21$^a$ are provided with ball-bearings at 32, 32$^a$ respectively and on their inner ends shafts 21 and 21$^a$ have bearings in the sleeves 28 and 28$^a$ respectively. The worm gear 19 is provided with ball-bearings 33 and 33$^a$ in the hubs 27 and 27$^a$ respectively. The sleeves 28 and 28$^a$ are adapted to rotate with respect to the shafts 21 and 21$^a$ and for this purpose are provided with ball-bearings 34, 35, 34$^a$, 35$^a$ respectively, in the surrounding frame work.

Assuming that the sleeves 28 and 28$^a$ and the gears 29 and 29$^a$ thereon are maintained stationary, then when the engine drives the shaft 15 the worm gear 19 is rotated and causes the planetary gears 26, 26$^a$ to rotate in the same direction thereby causing the shafts 21 and 21ª to rotate in the same direction and at the same speed to drive the traction wheels of the vehicle.

The shaft 15 is provided with ball-bearings 36 and 37 in the housing 17 and at its outer end there is secured thereto a friction disc 38. The friction disc 38 is adapted to be engaged by two friction wheels 39, 39ª pivoted on pivots 40 and 40ª respectively, secured to depending arms 41 and 41ª respectively. The arm 41 is carried by a bar 42 having a rack 43 thereon and adapted to slide horizontally in a guideway 44. The arm 41ª is secured to a bar 42ª having a rack 43ª thereon, and adapted to slide horizontally in a guideway 44ª. 45 represents an upright shaft having secured to its lower end a pinion 46 adapted to mesh with the rack 43ª and at its upper end the shaft 45 has secured thereto a hand wheel 47 so that upon turning the hand wheel 47 the gear 46 is turned to move the gear 43ª and so move the friction wheel 39ª over the surface of the friction disc 38 so that the two engage at points varying in distance from the axis of the disc 38. 48 represents a sleeve journalled about the shaft 45 and having secured to its lower end gear 49 meshing with the rack 43. At its upper end the sleeve 48 has secured thereto the hand wheel 50, so that upon turning the hand wheel 50 the gear 49 is turned to move the rack laterally so as to adjust the friction wheel to engage the disc 38 at various distances from its axis. The shaft 45 is journalled in the sleeve 48 and the sleeve 48 is journalled in a bearing 51.

The friction wheel 39 also frictionally engages a friction disc 52 secured upon one end of a shaft 53 journalled in suitable housing 54 on ball-bearings 55. At the other end of the shaft 53 there is keyed thereon the worm gear 31.

The friction wheel 39ª also frictionally engages a friction disc 56 rigidly secured on one end of a shaft 57 journalled on the housing 58 on ball-bearings 59. At the other end of the shaft 57 there is keyed thereto the worm gear 31ª. A seat 60 is provided for the operator so that he may conveniently operate the hand wheels 47 and 50 and the clutch lever 16.

In operation assuming that the friction wheels 39, 39ª are in the position shown in Fig. 4, the disc 38 driven by the shaft 15 will drive the friction wheels 39 and 39ª which in turn will drive the friction wheels 52 and 56 and their respective shafts 53 and 57 and worm gears 31 and 31ª which drive the worm gears 30 and 30ª and sleeves 28 and 28ª respectively and the bevel gears 29 and 29ª respectively, forming parts of the two differential gear arrangements in which the gears 25 and 25ª form the planetary gears thereto. With these conditions the gears 29 and 29ª are driven at the same speed as the gears 20 and 20ª respectively but in the opposite direction so that the planetary gears 25 and 25ª are rotated without causing any planetary movement thereof and, therefore, without causing any rotation of the shafts 21 and 21ª. Then with the parts in this position, the engine may be running in gear with the traction wheels without rotating the traction wheels. When it is desired to rotate the traction wheels the hand wheels 49 and 50 are rotated in order to move the friction wheels 39 and 39ª, both being moved toward the axis of the friction disc 38. This causes, assuming a given speed for the driving shaft 15, the friction wheels 39, 39ª, the friction discs 52, 56 the shafts 53, 57, the worm 31, 31ª, the worm wheels 30 30ª, and the bevel gears 29 29ª to be rotated more slowly so that planetary movement is given to the gears 25 and 25ª causing the shafts 21 and 21ª to which they are pivoted, to be rotated to drive the gears 22 and 22ª and the traction wheels of the vehicle. The speed at which the friction wheels are driven will depend, as will be clear to those skilled in the art, upon the distance to which the friction wheels 39 and 39ª are moved towards the axis of the friction disc 38. It will, therefore, be seen that the speed of the shafts 21 and 21ª and of the traction wheels driven thereby may be varied by infinite gradations by the gradual movement of the friction wheels 39 and 39ª.

If it is desired to rotate one traction wheel faster than the other in order to cause the vehicle to turn, one of the hand wheels 47 or 50 as the case may be is rotated more than the other so that the speed of one of the bevel gears 29 or 29ª is decreased so that it is less than that of the other and accordingly the shaft 21 or 21ª controlled thereby is given a greater relative speed. It will be clear that by thus providing the variable speed frictional devices effecting the gear arrangement which drives the respective shafts 21 and 21ª, the relative speeds of the shafts 21 and 21ª may be varied by infinite gradations independently of the speed of the driving shaft 15 and the speed of either of the shafts 21 or 21ª may be varied by infinite gradations independent of and without varying the speed of the other or the speed of the driving shaft 15.

If the friction wheels 39 and 39ª are moved farther apart from their positions as shown in Fig. 4 so that they are both caused to assume a position nearer the shafts 53 and 57 respectively, the bevel gears 29 and 29ª will be driven at a speed greater than the speed of the bevel gears 20 and 20ª respectively so as to cause the shafts 21 and 21ª to rotate slowly in the opposite direction and thus cause the traction wheels to back. By moving either one of the friction wheels 39 or 39ª toward its respective shaft 53 or 57 without bringing the other from the position shown in Fig. 4, only one of the traction wheels may be caused to back. The other traction wheel may be caused to move forward slowly by moving its corresponding friction wheel toward the axis of the friction disc 38.

Referring to the modified form of the invention shown in Figures 6 and 7 the main driving shaft 15 has keyed thereon a bevel pinion 70 which meshes with bevel pinions 71 and 72, to which are respectively secured friction discs 73 and 74. Slidably mounted upon the shafts 53 and 57 are friction wheels 75 and 76 respectively, the wheels 75 and 76 being splined to the shafts 53 and 57 so that they will rotate the shafts, but are still capable of longitudinal movement thereon. The friction wheels 75 and 76 are adapted to engage the friction discs 73 and 74 respectively so that when these discs are driven by the main driving shaft, the friction wheels 75 and 76 will be driven thereby at speeds dependent upon their relative position with respect to the axes of the discs 73 and 74. The sleeve 48 has secured to its lower end a gear 77 meshing with a curved rack 78 pivoted at 79 and to which is rigidly secured an arm 80 pivoted to links 81 at 82, the links 81 having their other ends pivoted at 83 to a nonrotatable sleeve 84 secured to and movable with the friction wheels 75, so that when the sleeve 48 is turned by the handle 50 the rack 78 is rotated and the arm 80 swung about pivot 79 causing the friction wheel 75 to be moved forward to engage the friction disc 73 at various distances from its axis. In a similar manner the shaft 45 has secured to its lower end a gear similar to the gear 77 which meshes with a curved rack 85 pivoted at 86 and having secured thereto an arm 87 to the outer end of which is pivoted at 88 links 89, having their other end pivoted at 90 to a nonrotatable sleeve 91 secured to the hub of the friction wheel 76 so that upon turning the shaft 45 by means of the hand wheel 47 friction wheel 76 may be made to engage the disc 74 at various points from its axis. In this way the worms 31 and 31ª secured to the shafts 53 and 57 may not only be rotated at various speeds as in connection with the form shown in Figures 1 to 5, but rotation of the shafts 53 and 57 may also be reversed, thus making the apparatus more flexible as a whole in its operation.

Although I have described my improvements in great detail and with respect to certain preferred embodiments thereof, I do not desire to be limited to such details or embodiments since many changes and modifications may be made and the improvements embodied in widely differing forms without departing from the spirit and scope of the invention in its broader aspects. Hence I desire to cover all arrangements having the combination of elements or their equivalents set forth in any one or more of the appended claims.

What I claim as new and desire to secure by Letters Patent is:

1. The combination of a driving means, a gear driven thereby, a planetary gear meshing with and driven by said first mentioned gear, a shaft rigidly secured to and driven by said planetary gear, a third gear meshing with said planetary gear, and means driving said last mentioned gear and varying the speed thereof with respect to said driving means to vary the speed of said shaft with respect to said first mentioned driving means, said last mentioned means including a variable speed frictional driving device for driving said last mentioned gear.

2. The combination of two shafts, a differential gear mechanism for driving one shaft, a differential gear mechanism for driving the other shaft, a common driving means for said differential gear mechanisms, whereby said common driving means acts to drive both of said shafts, a variable speed frictional driving device, affecting one of said differential gear mechanisms to vary the speed of the shaft driven thereby with respect to the driving means, and another variable speed frictional driving device affecting the other differential gear to vary the speed of the shaft driven thereby, with respect to the driving means.

3. The combination of two shafts, a differential gear mechanism for driving one shaft, a differential gear mechanism for driving the other shaft, a common driving means for said differential gear mechanisms, whereby said common driving means acts to drive both of said shafts, a variable speed frictional driving device, affecting one of said differential gear mechanisms to vary the speed of the shaft driven thereby with respect to the driving means, and another variable speed frictional driving device affecting the other differential gear to vary the speed of the shaft driven thereby, with respect to the driving means and means whereby the speed ratios of said variable speed frictional driving devices may be independently altered.

4. In a vehicle, the combination of two traction wheels, two shafts for driving said wheels respectively, common means including differential gearing for driving both of said shafts, and means for independently varying the speed of each shaft with respect to the speed of the other shaft and with respect to the speed of the driving means, said last mentioned means including two independently controlled variable speed frictional driving devices, driven by said common driving means, one for affecting the speed of one shaft and the other for affecting the speed of the other shaft.

5. In a vehicle, the combination of two traction wheels, two shafts for driving said wheels respectively, a differential gear mechanism for driving one shaft, another differential gear mechanism for driving the other shaft, a common driving means for simultaneously driving said two differential gear mechanisms, and two independently controlled variable speed frictional driving devices, driven by said common driving means, one for affecting the speed of one shaft and the other for affecting the speed of the other shaft.

6. In a vehicle, the combination of two traction wheels, two shafts for driving said wheels respectively, a differential gear mechanism for driving one shaft, another differential gear mechanism for driving the other shaft, a common driving means for simultaneously driving said two differential gear mechanisms, and variable speed frictional driving mechanism for affecting said differential gear mechanisms to vary the relative speeds of said shafts.

7. The combination of two shafts, a planetary gear carried by each shaft for driving the same, means driving said planetary gears to drive said shafts, and gears driven at variable speed by said driving means mashing with said planetary gears.

8. The combination of two shafts, a planetary gear carried by each shaft for driving the same, means driving said planetary gears to drive said shafts, and gears driven at variable speed meshing with said planetary gears and frictional driving means acting to drive said last mentioned gears at independently variable speeds.

Signed at New York in the county of New York and State of New York this 15th day of May A. D. 1918.

RICHARD STRESAU.